(12) United States Patent
Koike et al.

(10) Patent No.: US 7,989,378 B2
(45) Date of Patent: Aug. 2, 2011

(54) TIO$_2$-CONTAINING SILICA GLASS

(75) Inventors: Akio Koike, Tokyo (JP); Yasutomi Iwahashi, Tokyo (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/824,923

(22) Filed: Jun. 28, 2010

(65) Prior Publication Data

US 2010/0261597 A1   Oct. 14, 2010

Related U.S. Application Data

(63) Continuation of application No. PCT/JP2008/073932, filed on Dec. 25, 2008.

(30) Foreign Application Priority Data

Dec. 27, 2007   (JP) .................................. 2007-336603

(51) Int. Cl.
C03C 3/06   (2006.01)
C03C 3/11   (2006.01)
C03C 3/112   (2006.01)

(52) U.S. Cl. ............................. 501/54; 501/56; 501/57

(58) Field of Classification Search .................... 501/53, 501/54, 56, 57
See application file for complete search history.

(56) References Cited

U.S. PATENT DOCUMENTS

| | | | |
|---|---|---|---|
| 2,326,059 A | 8/1943 | Nordberg | |
| 5,970,751 A | 10/1999 | Maxon et al. | |
| 7,294,595 B2 | 11/2007 | Iwahashi et al. | |
| 7,410,922 B2 | 8/2008 | Iwahashi et al. | |
| 7,419,924 B2 | 9/2008 | Koike et al. | |
| 7,429,546 B2 | 9/2008 | Iwahashi et al. | |
| 7,462,574 B2 | 12/2008 | Iwahashi et al. | |
| 7,538,052 B2 | 5/2009 | Iwahashi et al. | |
| 2002/0157421 A1 | 10/2002 | Ackerman et al. | |
| 2005/0032622 A1* | 2/2005 | Dawes et al. | 501/54 |
| 2005/0272590 A1* | 12/2005 | Iwahashi et al. | 501/55 |
| 2006/0179879 A1 | 8/2006 | Ellison et al. | |
| 2007/0137252 A1* | 6/2007 | Maxon et al. | 65/384 |
| 2007/0207911 A1 | 9/2007 | Koike et al. | |
| 2007/0263281 A1* | 11/2007 | Maxon et al. | 359/352 |
| 2009/0122281 A1 | 5/2009 | Iwahashi et al. | |
| 2009/0242387 A1 | 10/2009 | Koike et al. | |

FOREIGN PATENT DOCUMENTS

JP         60176945 A      9/1985
(Continued)

OTHER PUBLICATIONS

U.S. Appl. No. 12/862,174, filed Aug. 24, 2010, Koike, et al.

(Continued)

*Primary Examiner* — Jerry Lorengo
*Assistant Examiner* — Noah S Wiese
(74) *Attorney, Agent, or Firm* — Oblon, Spivak, McClelland, Maier & Neustadt, L.L.P.

(57) ABSTRACT

The present invention is to provide a TiO$_2$—SiO$_2$ glass having suitable thermal expansion properties as an optical member of an exposure tool for EUVL. The present invention relates to a TiO$_2$-containing silica glass having a temperature, at which a coefficient of thermal expansion is 0 ppb/° C., falling within the range of 23±4° C. and a temperature width, in which a coefficient of thermal expansion is 0±5 ppb/° C., of 5° C. or more.

11 Claims, 3 Drawing Sheets

FOREIGN PATENT DOCUMENTS

| | | |
|---|---|---|
| JP | 2005-104820 | 4/2005 |
| WO | WO 98/52879 | 11/1998 |
| WO | WO 99/15468 | 4/1999 |
| WO | WO 2004/089836 A1 | 10/2004 |
| WO | WO 2004/089839 A1 | 10/2004 |
| WO | WO 2005/066090 A1 | 7/2005 |

OTHER PUBLICATIONS

U.S. Appl. No. 12/870,156, filed Aug. 27, 2010, Koike, et al.
U.S. Appl. No. 12/869,035, filed Aug. 26, 2010, Koike, et al.
U.S. Appl. No. 12/868,900, filed Aug. 26, 2010, Koike, et al.

* cited by examiner

TIO₂-CONTAINING SILICA GLASS

TECHNICAL FIELD

The present invention relates a $TiO_2$-containing silica glass (hereinafter referred to as "$TiO_2$—$SiO_2$ glass" in this specification), and in particular, to a $TiO_2$—$SiO_2$ glass to be used as an optical member of an exposure tool for EUV lithography. The EUV (extreme ultraviolet) light as referred to in the invention means light having a wavelength in a soft X-ray region or a vacuum ultraviolet region, specifically light having a wavelength of from about 0.2 to 100 nm.

BACKGROUND ART

In the photolithography technology, an exposure tool for manufacturing an integrated circuit by transferring a fine circuit pattern onto a wafer has hitherto been widely utilized. With the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer laser (wavelength: 193 nm) is coming to be employed. Also, in order to cope with a next-generation integrated circuit whose circuit line width will become not more than 70 nm, an immersion lithography technique and a double exposure technique, each using an ArF excimer laser, are regarded as being leading. However, it is considered that even these techniques would be able to cover only the generation with a line width of up to 45 nm.

Under the foregoing technical trends, a lithography technique using, as an exposure light source, light having a wavelength of 13 nm to represent EUV light (extreme ultraviolet light) is considered to be applicable over generation of 32 nm and thereafter, and is attracting attention. The principle of image formation of the EUV lithography (hereinafter referred to as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical member of an exposure tool for EUVL includes a photomask and a mirror, and is basically configured of (1) a substrate, (2) a reflective multilayer formed on the substrate and (3) an absorber layer formed on the reflective multilayer. For the reflective multilayer, an Mo/Si reflective multilayer in which an Mo layer and an Si layer are alternately laminated is investigated; and for the absorber layer, Ta and Cr are investigated. For the substrate, a material having a low coefficient of thermal expansion is required so as not to generate a strain even under irradiation with EUV light, and a glass having a low coefficient of thermal expansion or the like is investigated.

The $TiO_2$—$SiO_2$ glass is known as an extremely low thermal expansion material having a coefficient of thermal expansion (CTE) lower than that of a silica glass. Also, since the coefficient of thermal expansion can be controlled by the $TiO_2$ content in glass, a zero-expansion glass whose coefficient of thermal expansion is closed to 0 can be obtained. Accordingly, the $TiO_2$—$SiO_2$ glass involves a possibility as a material to be used in an optical member of an exposure tool for EUVL.

According to the conventional preparation method of a $TiO_2$—$SiO_2$ glass, first of all, a silica precursor and a titania precursor are each converted into a gas phase and then mixed with each other. The mixture in a gas phase is introduced into a burner and thermally decomposed, thereby forming a $TiO_2$—$SiO_2$ glass particle. This $TiO_2$—$SiO_2$ glass particle is deposited in a refractory container and melted therein simultaneously with the deposition, thereby forming a $TiO_2$—$SiO_2$ glass.

Also, Patent Document 1 discloses a method in which a $TiO_2$—$SiO_2$ porous glass body is formed and converted it into a glass body, and a mask substrate is then obtained.

The optical member of an exposure tool for EUVL reaches a temperature of about 100° C. during the film formation of a reflective film or the like at the time of its manufacture. Also, since EUV light with high energy is irradiated at the time of use in the exposure tool for EUVL, there is a concern that the temperature of the member locally rises.

For these reasons, it is desirable that the optical member of an exposure tool for EUVL has a wide temperature region where the coefficient of thermal expansion is substantially zero. However, the conventional $TiO_2$—$SiO_2$ glasses have a narrow temperature region where the coefficient of thermal expansion is substantially zero, and hence, were insufficient for the use as an optical member of an exposure tool for EUVL.

In order to solve the foregoing problems in the conventional techniques, the present inventors disclose, in Patent Document 2, a $TiO_2$—$SiO_2$ glass having a fictive temperature of not higher than 1,200° C., an F concentration of 100 ppm or more and a coefficient of thermal expansion at from 0 to 100° C. of 0±200 ppb/° C., and a method for manufacturing the $TiO_2$—$SiO_2$ glass.

It had been thought that the $TiO_2$—$SiO_2$ glass is small in a change of a coefficient of thermal expansion relative to the temperature, namely wide in the temperature range where the coefficient of thermal expansion is substantially zero, is excellent in homogeneity of the coefficient of thermal expansion and the mechanical properties in glass, and is extremely suitable as a raw material of the member which constitutes an optical system to be used for EUVL.

Patent Document 1: US-A-2002/157421
Patent Document 2: JP-A-2005-104820

DISCLOSURE OF THE INVENTION

Figure 2:
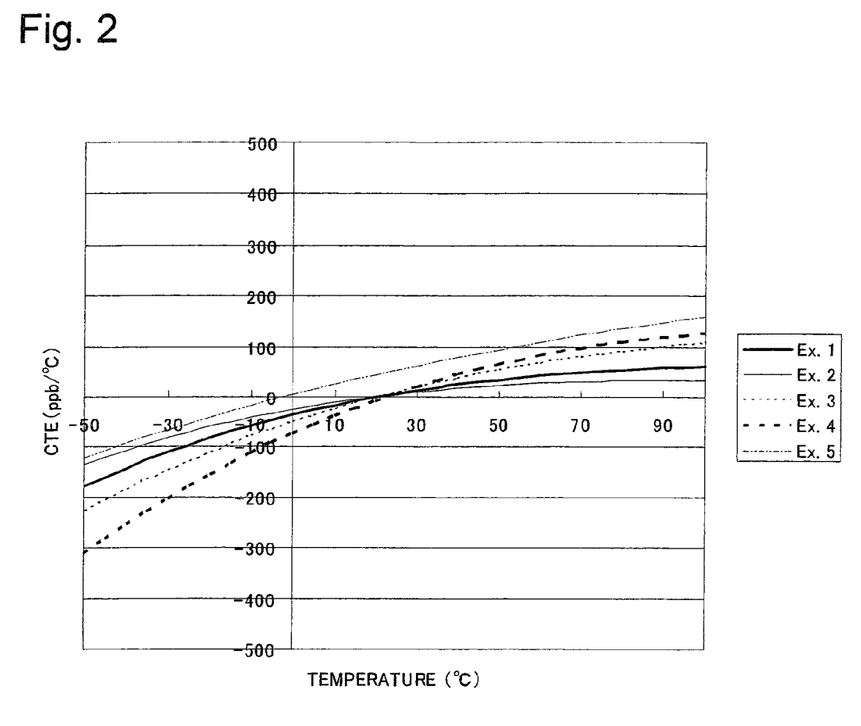
FIG. 2 is a graph of plotting the relationship between CTE and the temperature, with respect to Examples 1 to 5.

However, as is clear from FIG. 2 of Patent Document 2, more specifically, as is clear from the comparison between Example 1 and Example 2 in FIG. 2, even in a $TiO_2$—$SiO_2$ glass having a fictive temperature of not higher than 1,200° C. and an F concentration of 100 ppm or more, the temperature dependence of a coefficient of thermal expansion is different if the F concentration is different.

Also, as is clear from the comparison among Examples 3 to 5 of FIG. 2, though they are not concerned with an F-containing $TiO_2$—$SiO_2$ glass, the temperature dependence of a coefficient of thermal expansion is different if the fictive temperature is different.

Accordingly, though the $TiO_2$—$SiO_2$ glass disclosed in Patent Document 2 has a wide temperature range where the coefficient of thermal expansion is substantially zero, if at least one of the F concentration and the fictive temperature is different, the temperature dependence of a coefficient of thermal expansion becomes different, and the temperature region where the coefficient of thermal expansion is substantially zero becomes different.

In carrying out EUVL, the temperature in an exposure tool for EUVL is strictly controlled. In the optical member of an exposure tool for EUVL, it is necessary that the coefficient of thermal expansion is substantially zero under the strictly controlled temperature. However, with the $TiO_2$—$SiO_2$ glass disclosed in Patent Document 2, there may be the case where the coefficient of thermal expansion is not substantially zero at the temperature in the exposure tool, and hence, the $TiO_2$—$SiO_2$ glass disclosed in Patent Document 2 was not necessarily sufficient as the optical member of an exposure tool for EUVL.

In order to solve the foregoing problems of the background art techniques, an object of the invention is to provide a $TiO_2$—$SiO_2$ glass having suitable thermal expansion properties as an optical member of an exposure tool for EUVL. More specifically, an object of the invention is to provide a $TiO_2$—$SiO_2$ glass whose coefficient of thermal expansion at the time of irradiation with EUV light is substantially zero when used as an optical member of an exposure tool for EUVL.

In order to achieve the foregoing objects, the invention provides a $TiO_2$-containing silica glass (hereinafter referred to as "$TiO_2$-$SiO_2$ glass of the invention") having a temperature, at which a coefficient of thermal expansion is 0 ppb/° C., falling within the range of 23±4° C. and a temperature width, in which a coefficient of thermal expansion is 0±5 ppb/° C., of 5° C. or more.

It is preferred that the $TiO_2$—$SiO_2$ glass of the invention has a fictive temperature of not higher than 850° C., a $TiO_2$ content of from 3 to 9% by mass and an OH concentration of 100 ppm or more.

It is preferred that the $TiO_2$—$SiO_2$ glass of the invention has a fictive temperature of not higher than 850° C., a $TiO_2$ content of from 3 to 9% by mass and an F concentration of 1,000 ppm or more.

In the $TiO_2$—$SiO_2$ glass of the invention, a temperature range where a coefficient of thermal expansion is substantially zero is wide, and the temperature region where a coefficient of thermal expansion is substantially zero is coincident with the temperature of an optical member at the time of irradiation with EUV light. Therefore, the $TiO_2$—$SiO_2$ glass of the invention is extremely suitable as an optical member of an exposure tool for EUVL.

BEST MODE FOR CARRYING OUT THE INVENTION

The $TiO_2$—$SiO_2$ glass of the invention is hereunder described with reference to the accompanying drawings.

The $TiO_2$—$SiO_2$ glass of the invention has a temperature, at which a coefficient of thermal expansion (CTE) is 0 ppb/° C. (cross-over temperature; COT), falling within the range of 23±4° C. and a temperature width ΔT, in which a coefficient of thermal expansion (CTE) is 0±5 ppb/° C., of 5° C. or more.

Figure 1:
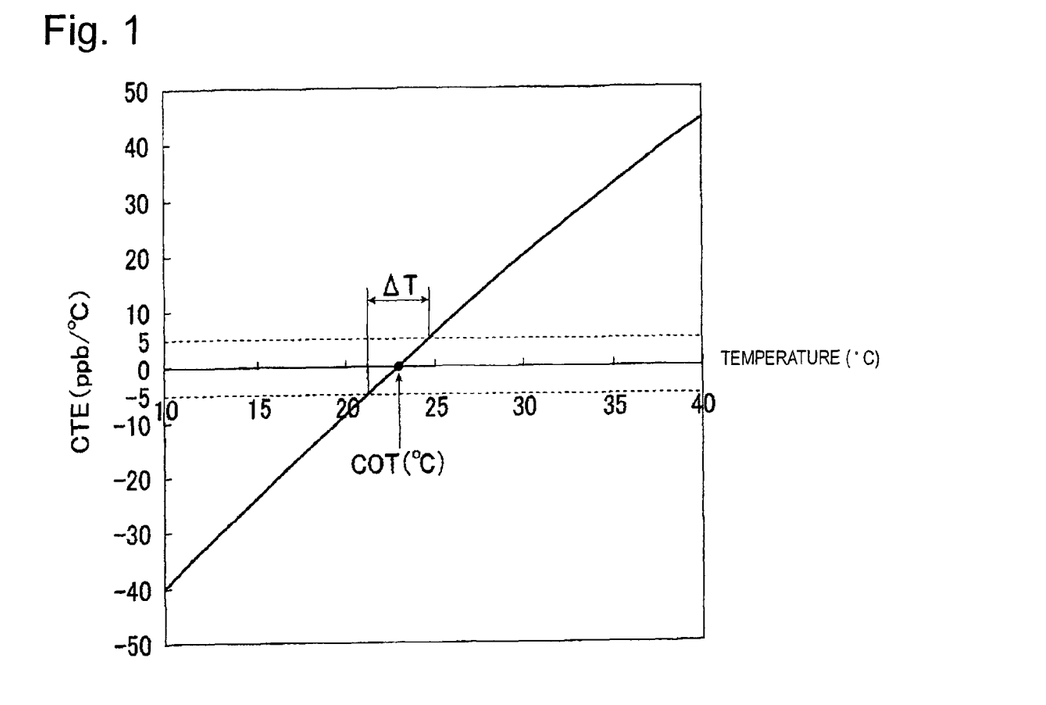
FIG. 1 is a graph of plotting the relationship between CTE and the temperature.

The COT and ΔT of $TiO_2$—$SiO_2$ glass can be determined by measuring a coefficient of thermal expansion (CTE) of the $TiO_2$—$SiO_2$ glass by a known method, for example, by using a laser interferometric dilatometer in the temperature range of from −150 to +200° C. and plotting the relationship between CTE and the temperature as shown in FIG. 1.

In carrying out EUVL, for the purpose of preventing changes in dimension and shape of an optical member such as a mirror relative to the temperature, it is desirable for the optical member to be placed in an exposure tool for EUVL that the coefficient of thermal expansion at 22±2° C. is 0±5 ppb/° C., i.e., substantially zero. It is more desirable that for the optical member to be placed in an exposure tool for EUVL that the coefficient of thermal expansion at 22±3° C. is 0±5 ppb/° C., i.e., substantially zero. However, it has been suggested that the temperature of the optical member locally rises, especially in the case of a member close to a light source, because EUV light with high energy is irradiated.

Though it depends on an irradiation condition of EUV light, there may be the case where the temperature of the optical member locally rises by about 4 to 6° C. under a usual irradiation condition of EUV light in carrying out EUVL.

When the COT is in the range of 23±4° C., namely from 19° C. (i.e., 23-4° C.) to 27° C. (i.e., 23+4° C.), and the temperature range ΔT where the coefficient of thermal expansion is 0±5 ppb/° C. is 5° C. or more, the coefficient of thermal expansion of the optical member is substantially zero under a temperature condition (22±2° C.) of the optical member at the time of irradiation with EUV light. In this specification, the phrase "the coefficient of thermal expansion being substantially zero" means that the coefficient of thermal expansion being 0±5 ppb/° C.

Also, in the $TiO_2$—$SiO_2$ glass of the invention, the ΔT is preferably 6° C. or more, and more preferably 7° C. or more. When the ΔT is 8° C. or more, the coefficient of thermal expansion can be ±5 ppb/° C. in the foregoing temperature range of 23±4° C., and hence, the ΔT is especially preferably 8° C. or more.

The $TiO_2$—$SiO_2$ glass of the invention satisfying the foregoing COT and ΔT requirements can be obtained by regulating either or both of the glass composition and the fictive temperature.

An embodiment of the $TiO_2$—$SiO_2$ glass of the invention satisfying the foregoing COT and ΔT requirements (hereinafter referred to as "$TiO_2$—$SiO_2$ glass (1)") satisfies the following requirements.

$TiO_2$ content: 3 to 9% by mass
Fictive temperature: not higher than 850° C.
OH concentration: 100 ppm or more Accordingly, the $TiO_2$—$SiO_2$ glass (1) contains OH in addition to $TiO_2$ and $SiO_2$. In the $TiO_2$—$SiO_2$ glass (1), though the remainder exclusive of $TiO_2$ and OH is $SiO_2$, other components than $TiO_2$, $SiO_2$ and OH may be contained.

It is known that the coefficient of thermal expansion of $TiO_2$—$SiO_2$ glass varies with the concentration of $TiO_2$ to be contained (see, for example, P. C. Schultz and H. T. Smyth, in: R. W. Douglas and B. Ellis, *Amorphous Materials*, Willey, New York, p. 453 (1972)).

Accordingly, it is possible to control COT of the $TiO_2$—$SiO_2$ glass by controlling the $TiO_2$ content of the $TiO_2$—$SiO_2$ glass. Specifically, the COT is controlled such that when the fictive temperature of the $TiO_2$—$SiO_2$ glass is set lower, the $TiO_2$ content is made higher, whereas when the OH content of the $TiO_2$—$SiO_2$ glass is set higher, the $TiO_2$ content is made higher. The $TiO_2$—$SiO_2$ glass (1) has a $TiO_2$ content of from 3 to 9% by mass. When the $TiO_2$ content is less than 3% by mass or exceeds 9% by mass, the COT does not exist in the range of 23±4° C. Specifically, when the $TiO_2$ content is less than 3% by mass, the COT is lower than 19° C. Also, when the TiO$_2$ content exceeds 9% by mass, the COT exceeds 27° C. The TiO$_2$ content is preferably 5% by mass or more, and more preferably 6% by mass or more. Also, the TiO$_2$ content is preferably not more than 8% by mass.

As described in Patent Document 2, the present inventors have found that the fictive temperature is correlated with the width of the temperature range of zero expansion, namely, the fictive temperature is correlated with ΔT, and more specifically, when the fictive temperature is high, the ΔT is narrow, whereas when the fictive temperature is low, the ΔT is wide.

Owing to the fictive temperature of not higher than 850° C., the TiO$_2$—SiO$_2$ glass (1) has ΔT of 5° C. or more. When the fictive temperature exceeds 850° C., the ΔT is less than 5° C.; and there is a concern that when the TiO$_2$—SiO$_2$ glass (1) is used as an optical member of an exposure tool for EUVL, the coefficient of thermal expansion of the optical member at the time of irradiation with EUV light may be not substantially zero.

In order to obtain the TiO$_2$—SiO$_2$ glass (1) having a fictive temperature of not higher than 850° C., a method of keeping a TiO$_2$—SiO$_2$ glass molded article formed in a prescribed shape at a temperature of from 600 to 1,200° C. for 2 hours or more, and then decreasing the temperature to not higher than 700° C. at an average temperature-decreasing rate of not more than 5° C./hr (These procedures are hereinafter referred to as "procedures (A)") is effective. In the Examples as described below, it is shown that when a TiO$_2$—SiO$_2$ glass molded article was kept at 1,100° C. for 10 hours, subsequently subjected to temperature decrease to 500° C. at a rate of 5° C./hr and then allowed to stand for natural cooling according to the foregoing method, the obtained TiO$_2$—SiO$_2$ glass (1) had a fictive temperature of 840° C. When the temperature decrease is carried out at a slower average temperature-decreasing rate, a lower fictive temperature is attained. For example, when the temperature decrease is carried out at a rate of 1° C./hr, the fictive temperature can be 800° C. or lower.

The fictive temperature of the TiO$_2$—SiO$_2$ glass can be measured by known procedures. In the Examples as described below, the fictive temperature of the TiO$_2$—SiO$_2$ glass was measured by the following procedures.

With respect to a mirror polished TiO$_2$—SiO$_2$ glass, an absorption spectrum is obtained by an infrared spectrometer (Magna 760, manufactured by Nikolet Company was used in the Examples as described below). In this measurement, a data taking interval is set up at about 0.5 cm$^{-1}$, and an average value obtained by scanning 64 times is employed for the absorption spectrum. In the thus obtained infrared absorption spectrum, a peak observed in the vicinity of 2,260 cm$^{-1}$ is attributed to an overtone of stretching vibration by an Si—O—Si bond of the TiO$_2$—SiO$_2$ glass. A calibration curve is prepared from a glass of the same composition having a known fictive temperature by using this peak position, thereby determining the fictive temperature. Alternatively, a reflection spectrum of the surface is measured in the same manner by using the same infrared spectrometer. In the thus obtained infrared reflection spectrum, a peak observed in the vicinity of 1,120 cm$^{-1}$ is attributed to stretching vibration by an Si—O—Si bond of the TiO$_2$—SiO$_2$ glass. A calibration curve is prepared from a glass of the same composition having a known fictive temperature by using this peak position, thereby determining the fictive temperature. A shift of the peak position by a change in the glass composition can be extrapolated from the composition dependency of the calibration curve.

When the TiO$_2$—SiO$_2$ glass (1) is used as an optical member of an exposure tool for EUVL, it is important to make the TiO$_2$/SiO$_2$ composition ratio in the glass uniform, from the standpoint of reducing a variation of the coefficient of thermal expansion in the glass.

In the TiO$_2$—SiO$_2$ glass (1), a variation of the fictive temperature is preferably within 50° C., and more preferably within 30° C. When the variation of the fictive temperature exceeds the foregoing range, there is a concern that a difference in the coefficient of thermal expansion is generated depending upon the site.

In this specification, the "variation of the fictive temperature" is defined as a difference between a maximum value and a minimum value of the fictive temperature within an area of 50 mm×50 mm in at least one plane.

The variation of the fictive temperature can be measured as follows. A transparent TiO$_2$—SiO$_2$ glass body formed in a prescribed size is sliced to form a TiO$_2$—SiO$_2$ glass block of 50 mm×50 mm×2.0 mm. With respect to the 50 mm×50 mm plane of this TiO$_2$—SiO$_2$ glass block, by measuring a fictive temperature at intervals of a 10 mm pitch according to the foregoing method, the variation of the fictive temperature of the formed TiO$_2$—SiO$_2$ glass body is determined.

In order to regulate the fictive temperature to not higher than 850° C., it is preferred that the TiO$_2$—SiO$_2$ glass (1) has an OH concentration of 100 ppm or more.

By the addition of OH, the structural relaxation of the glass is accelerated so that it becomes easy to realize a glass structure having a low fictive temperature. Therefore, for the purpose of lowering the fictive temperature of the TiO$_2$—SiO$_2$ glass, it is an effective measure to incorporate OH. By regulating the OH concentration of the TiO$_2$—SiO$_2$ glass (1) to 100 ppm or more and carrying out the procedures (A), the TiO$_2$—SiO$_2$ glass (1) having a fictive temperature of not higher than 850° C. can be obtained. When the OH concentration is less than 100 ppm, it takes a very long period of time to obtain a TiO$_2$—SiO$_2$ glass having a fictive temperature of not higher than 850° C.

For the purpose of lowering the fictive temperature of the glass, the OH concentration is regulated preferably to 200 ppm or more, and more preferably to 400 ppm or more. For the purpose of more effectively lowering the fictive temperature, for example, lowering the fictive temperature without lowering the average temperature-decreasing rate in the procedures (A), the OH concentration is preferably 900 ppm or more, and more preferably 1,000 ppm or more.

The OH concentration of the TiO$_2$—SiO$_2$ glass can be measured by using a known method. For example, the OH concentration can be determined from an absorption peak at a wavelength of 2.7 μm through the measurement by an infrared spectrometer (see J. P. Williams, et al., *American Ceramic Society Bulletin*, 55(5), 524, 1976). The detection limit of this method is 0.1 ppm.

As the method for manufacturing an OH-containing TiO$_2$—SiO$_2$ glass, there are several processes as follows. As one example thereof, there is a manufacturing method in which a TiO$_2$—SiO$_2$ glass fine particle (soot) obtained by flame hydrolysis or thermal decomposition of an Si precursor and a Ti precursor serving as glass-forming raw materials is deposited and grown by a soot process, thereby obtaining a porous TiO$_2$—SiO$_2$ glass body; and after treating the obtained porous TiO$_2$—SiO$_2$ glass body in a water vapor-containing atmosphere, it is heated to a densification temperature or higher in a water vapor-containing atmosphere and further heated to a transparent vitrification temperature or higher, thereby obtaining an OH-containing TiO$_2$—SiO$_2$ glass. Examples of the soot process include an MCVD process, an OVD process and a VAD process depending upon the preparation manner.

The densification temperature as referred to in this specification means a temperature at which the porous glass body can be densified to an extent that a void cannot be confirmed by an optical microscope. Also, the transparent vitrification temperature as referred to herein means a temperature at which a crystal cannot be confirmed by an optical microscope, and a transparent glass is obtained.

Also, there is a manufacturing method in which an Si precursor and a Ti precursor serving as glass-forming raw materials are hydrolyzed and oxidized in an oxyhydrogen flame at from 1,800 to 2,000° C., thereby obtaining an OH-containing $TiO_2$—$SiO_2$ glass. At that time, the OH concentration is controlled by controlling the flame temperature or gas concentration.

In the $TiO_2$—$SiO_2$ glass (1), so far as the variation of the fictive temperature falls within 50° C., and the variation of the OH concentration falls within 50 ppm, it enables the distribution of coefficient of thermal expansion to fall within 300 ppb/° C. within an area of 50 mm×50 mm in at least one plane, and hence is suitable as an optical member for an exposure tool for EUVL.

The distribution of the coefficient of thermal expansion of the $TiO_2$—$SiO_2$ glass can be measured by using a known method. For example, a transparent $TiO_2$—$SiO_2$ glass formed in a prescribed size is cut and divided into $TiO_2$—$SiO_2$ glass small pieces of 15 mm×15 mm×1 mm, and the respective small pieces are measured for a coefficient of thermal expansion, thereby determining the variation of the coefficient of thermal expansion of a formed $TiO_2$—$SiO_2$ glass block.

For the purpose of manufacturing the $TiO_2$—$SiO_2$ glass (1), a manufacturing method including the following steps (a) to (e) can be adopted.

Step (a):

A $TiO_2$—$SiO_2$ glass fine particle obtained through flame hydrolysis of an Si precursor and a Ti precursor, each of which is a glass-forming raw material, are deposited and grown on a substrate, thereby forming a porous $TiO_2$—$SiO_2$ glass body. The glass-forming raw material is not particularly limited so far as it is a raw material capable of being gasified. Examples of the Si precursor include silicon halides such as chlorides (for example, $SiCl_4$, $SiHCl_3$, $SiH_2Cl_2$, $SiH_3Cl$, etc.), fluorides (for example, $SiF_4$, $SiHF_3$, $SiH_2F_2$, etc.), bromides (for example, $SiBr_4$, $SiHBr_3$, etc.) and iodides (for example, $SiI_4$, etc.); and alkoxysilanes represented by $R_nSi(OR)_{4-n}$ (wherein R represents an alkyl group having from 1 to 4 carbon atoms; and n represents an integer of from 0 to 3). Also, examples of the Ti precursor include titanium halides (for example, $TiCl_4$, $TiBr_4$, etc.); and alkoxy titaniums represented by $R_nTi(OR)_{4-n}$ (wherein R represents an alkyl group having from 1 to 4 carbon atoms; and n represents an integer of from 0 to 3). Also, as the Si precursor and the Ti precursor, a compound of Si and Ti such as a silicon titanium double alkoxide can be used.

A seed rod made by silica glass (for example, the seed rod described in JP-B-63-24973) can be used as the substrate. Also, the shape of the substrate to be used is not limited to a rod form but may be in a plate form.

Step (b):

The porous $TiO_2$—$SiO_2$ glass body obtained in the step (a) is subjected to temperature rise to a densification temperature in a water vapor-containing atmosphere, thereby obtaining an OH-containing $TiO_2$—$SiO_2$ dense body.

The densification temperature is in general from 1,250 to 1,550° C., and especially preferably from 1,300 to 1,500° C. When the OH content is 600 ppm or more, the viscosity of the glass is lowered, and the densification temperature is lowered. Accordingly, the temperature is preferably from 1,250 to 1,450° C., and especially preferably from 1,300 to 1,400° C. As the water vapor-containing atmosphere, an inert gas atmosphere where a water vapor partial pressure ($P_{H_2O}$) is from 10,000 to 200,000 Pa is preferred. Helium is preferred as the inert gas. It is preferred that the treatment is carried out at a pressure of from about 10,000 to 200,000 Pa under such an atmosphere.

When it is intended to regulate the OH concentration to less than 200 ppm, the treatment may be carried out in an inert gas atmosphere where the water vapor partial pressure is from 10,000 to 30,000 Pa; when it is intended to regulate the OH concentration to from 200 to 400 ppm, the treatment may be carried out in an inert gas atmosphere where the water vapor partial pressure is from 20,000 to 50,000 Pa; when it is intended to regulate the OH concentration to from 400 to 600 ppm, the treatment may be carried out in an inert gas atmosphere where the water vapor partial pressure is from 30,000 to 80,000 Pa; and when it is intended to regulate the OH concentration to more than 600 ppm, the treatment may be carried out in an inert gas atmosphere where the water vapor partial pressure is 50,000 Pa or more. The term "Pa" as referred to in this specification means an absolute pressure, not a gauge pressure.

Also, in the step (b), it is preferred for attaining increased homogeneity of the $TiO_2$—$SiO_2$ dense body that after placing the porous $TiO_2$—$SiO_2$ glass body under a reduced pressure (preferably not more than 13,000 Pa, and especially not more than 1,300 Pa), an inert gas and an inert gas containing a water vapor or a water vapor is introduced until a prescribed water vapor partial pressure is attained, so that the atmosphere contains a water vapor.

Furthermore, it is preferred for attaining increased homogeneity of the $TiO_2$—$SiO_2$ dense body that after keeping the porous $TiO_2$—$SiO_2$ glass body in a water vapor-containing atmosphere at room temperature or a temperature of not higher than the densification temperature, the temperature is raised to the densification temperature.

Step (c):

The OH-containing $TiO_2$—$SiO_2$ dense body obtained in the step (b) is subjected to temperature rise to the transparent vitrification temperature, thereby obtaining an OH-containing transparent $TiO_2$—$SiO_2$ glass body. The transparent vitrification temperature is usually from 1,350 to 1,800° C., and especially preferably from 1,400 to 1,750° C. When the OH content is 600 ppm or more, the viscosity of the glass is lowered, and the transparent vitrification temperature is lowered. Accordingly, the temperature is preferably from 1,350 to 1,750° C., and especially preferably from 1,400 to 1,700° C.

As the atmosphere, an atmosphere of 100% of an inert gas such as helium and argon, or an atmosphere containing, as a major component, an inert gas such as helium and argon, is preferred. The pressure may be a reduced pressure or normal pressure. In the case of a reduced pressure, the pressure is preferably not higher than 13,000 Pa.

Step (d):

The OH-containing transparent $TiO_2$—$SiO_2$ glass body obtained in the step (c) is heated to a temperature of the softening point or higher and formed in a desired shape, thereby obtaining an OH-containing formed $TiO_2$—$SiO_2$ glass body. The forming temperature is preferably from 1,500 to 1,800° C. When the forming temperature is lower than 1,500° C., since the viscosity of the OH-containing transparent $TiO_2$—$SiO_2$ glass body is high, self-weight deformation does not substantially proceed. Also, the growth of cristobalite which is a crystal phase of $SiO_2$ or the growth of rutile or anatase which is a crystal phase of $TiO_2$ occurs, thereby causing so-called devitrification. When the forming temperature exceeds 1,800° C., sublimation of $SiO_2$ cannot be neglected.

The step (c) and the step (d) can be carried out continuously or simultaneously.

Step (e):

The formed $TiO_2$—$SiO_2$ glass body obtained in the step (d) is kept at a temperature of from 600 to 1,200° C. for one hour or more and then subjected to an annealing treatment of decreasing the temperature to not higher than 500° C. at an average temperature-decreasing rate of not more than 5° C./hr, thereby controlling the fictive temperature of the $TiO_2$—$SiO_2$ glass. Alternatively, the formed $TiO_2$—$SiO_2$ glass body which is obtained in the step (d) and is at 1,200° C. or higher is subjected to an annealing treatment of decreasing the temperature to not higher than 500° C. at an average temperature-decreasing rate of not more than 60° C./hr, thereby controlling the fictive temperature of the $TiO_2$—$SiO_2$ glass. After decreasing the temperature to not higher than 500° C., the $TiO_2$—$SiO_2$ glass can be allowed to stand for cooling. In that case, the atmosphere is preferably an atmosphere of 100% of an inert gas such as helium, argon and nitrogen, an atmosphere containing, as a major component, such an inert gas, or an air atmosphere; and the pressure is preferably a reduced pressure or normal pressure.

For the purpose of attaining a lower fictive temperature, it is effective to carry out cooling at a slower cooling rate in a temperature region in the vicinity of an annealing point or a strain point of the glass.

Specifically, in the case where the OH concentration of the $TiO_2$—$SiO_2$ glass is 100 ppm or more, or in the case where the F content of the $TiO_2$—$SiO_2$ glass is 1000 ppm or more, the slowest cooling rate in the cooling profile of the step (e) is preferably not more than 5° C./hr, more preferably not more than 4° C./hr, further preferably not more than 2.5° C./hr, especially preferably not more than 2° C./hr, and most preferably not more than 1.5° C./hr.

Further, in the case where the OH concentration of the $TiO_2$—$SiO_2$ glass is less than 100 ppm, or in the case where the F content of the $TiO_2$—$SiO_2$ glass is less than 1000 ppm, the slowest cooling rate in the cooling profile of the step (e) is preferably not more than 2.0° C./hr, more preferably not more than 1.5° C./hr, and further preferably not more than 1.0° C./hr.

Here, temperature raising/decreasing steps that require 100 hours or longer for a temperature change of within ±5° C. are regarded as temperature-holding steps. In the temperature-varying steps other than the above-mentioned temperature-holding steps, the average temperature-decreasing rate determined from a temperature decrease exceeding 5° C. and the time necessary for the temperature decrease is defined as a cooling rate. Of the cooling rates thus defined, the lowest cooling rate is referred to as the slowest cooling rate.

Another embodiment of the $TiO_2$—$SiO_2$ glass of the invention satisfying the foregoing COT and $\Delta T$ requirements (hereinafter referred to as "$TiO_2$—$SiO_2$ glass (2)") satisfies the following requirements.

$TiO_2$ content: 3 to 9% by mass
Fictive temperature: not higher than 850° C.
F concentration: 1,000 ppm or more Accordingly, the $TiO_2$—$SiO_2$ glass (2) contains F in addition to $TiO_2$ and $SiO_2$. In the $TiO_2$—$SiO_2$ glass (2), though the remainder exclusive of $TiO_2$ and F is $SiO_2$, other components than $TiO_2$, $SiO_2$ and F may be contained.

It is possible to control the COT of the $TiO_2$—$SiO_2$ glass by controlling the $TiO_2$ content of the $TiO_2$—$SiO_2$ glass. Specifically, the COT is controlled such that when the fictive temperature of the $TiO_2$—$SiO_2$ glass is set lower, the $TiO_2$ content is made higher, whereas when the F content of the $TiO_2$—$SiO_2$ glass is set higher, the $TiO_2$ content is made lower.

The $TiO_2$—$SiO_2$ glass (2) has a $TiO_2$ content of from 3 to 9% by mass. When the $TiO_2$ content is less than 3% by mass or exceeds 9% by mass, there is a concern that the COT does not exist in the temperature range of 23±4° C. Specifically, when the $TiO_2$ content is less than 3% by mass, the COT is lower than 19° C. (i.e., 23-4° C.). Also, when the $TiO_2$ content exceeds 9% by mass, the COT exceeds 27° C. (i.e., 23+4° C.). The $TiO_2$ content is preferably 4% by mass or more, and more preferably 5% by mass or more. Also, the $TiO_2$ content is preferably not more than 8% by mass, more preferably not more than 7.5% by mass, and especially preferably not more than 7.0% by mass.

Owing to the fictive temperature of not higher than 850° C. and the F concentration of 10,000 ppm or more, the $TiO_2$—$SiO_2$ glass (2) has $\Delta T$ of 5° C. or more. When the fictive temperature exceeds 850° C., the $\Delta T$ is less than 5° C.; and there is a concern, though it depends on the COT of the glass, that when the $TiO_2$—$SiO_2$ glass (2) is used as an optical member of an exposure tool for EUVL, the coefficient of thermal expansion of the optical member at the time of irradiation with EUV light may be not substantially zero. Taking into account the fact that the lower the fictive temperature, the wider $\Delta T$, the fictive temperature is preferably not higher than 830° C., and more preferably not higher than 800° C. In order to further widen $\Delta T$, the fictive temperature is preferably not higher than 780° C.

In order to obtain the $TiO_2$—$SiO_2$ glass (2) having a fictive temperature of not higher than 850° C., a method of keeping a $TiO_2$—$SiO_2$ glass molded article formed in a prescribed shape at a temperature of from 600 to 1,200° C. for 2 hours or more, and then decreasing the temperature to 500° C. at an average temperature-decreasing rate of not more than 5° C./hr (These procedures are hereinafter referred to as "procedures (B)") is effective. In the Examples as described below, it is shown that when a $TiO_2$—$SiO_2$ glass molded article was kept at 1,000° C. for 10 hours, subsequently subjected to temperature decrease to 300° C. at a rate of 5° C./hr and then allowed to stand for natural cooling according to the foregoing method, the obtained $TiO_2$—$SiO_2$ glass (2) had a fictive temperature of 750° C.

When the $TiO_2$—$SiO_2$ glass (2) is used as an optical member of an exposure tool for EUVL, it is important to make the $TiO_2$/$SiO_2$ composition ratio in the glass uniform, from the standpoint of reducing a variation of the coefficient of thermal expansion in the glass.

In the $TiO_2$—$SiO_2$ glass (2), a variation of the fictive temperature is preferably within 50° C., and especially preferably within 30° C. When the variation of the fictive temperature exceeds the foregoing range, there is a concern that a difference in the coefficient of thermal expansion is generated depending upon the site.

In order to regulate the fictive temperature to not higher than 850° C., the $TiO_2$—$SiO_2$ glass (2) has an F concentration of 1,000 ppm or more.

It has already been known that the addition of F affects the structural relaxation of the glass (*Journal of Applied Physics*, 91(8), 4886 (2002)). According to this, by the addition of F, the structural relaxation time is accelerated so that it becomes easy to realize a glass structure having a low fictive temperature (first effect). Therefore, for the purpose of lowering the fictive temperature of the $TiO_2$—$SiO_2$ glass, it is an effective measure to add F. Also, it is considered that the addition of F gives rise to an effect for widening the range of the $\Delta T$ (second effect).

By regulating the F concentration of the $TiO_2$—$SiO_2$ glass (2) to 1,000 ppm or more and carrying out the procedures (B), it is possible to obtain the $TiO_2$—$SiO_2$ glass (2) having a fictive temperature of not higher than 850° C. When the procedures (B) are carried out under a condition that the F concentration is less than 1,000 ppm, it is difficult to obtain a TiO$_2$—SiO$_2$ glass having a fictive temperature of not higher than 850° C., and the ΔT of the TiO$_2$—SiO$_2$ glass does not become 5° C. or more.

For the purposes of lowering the fictive temperature of the glass and making the ΔT wide, the F concentration is regulated preferably to 3,000 ppm or more, more preferably to 5,000 ppm or more, and especially preferably to 7,000 ppm or more.

The F concentration can be measured by using a known method and, for example, can be measured according to the following procedures. That is, a TiO$_2$—SiO$_2$ glass is melted by heating with anhydrous sodium carbonate, and distilled water and hydrochloric acid are added to the obtained melt in a volume ratio to the melt of 1, respectively, thereby preparing a sample liquid. An electromotive force of the sample liquid is measured by a radio meter using No. 945-220 and No. 945-468 (all of which are manufactured by Radio Meter Trading Co., Ltd.) as a fluorine ion selective electrode and a reference electrode, respectively; and a fluorine content is determined on the basis of a calibration curve which has been previously prepared using a fluorine ion standard solution (*Nippon Kagaku Kaishi*, 1972(2), 350). The detection limit of this method is 10 ppm.

The fluorine-containing TiO$_2$—SiO$_2$ glass can be manufactured by employing the same soot process as in the foregoing OH-containing TiO$_2$—SiO$_2$ glass or a direct process. However, in the soot process, fluorine-containing materials are used as an Si precursor and a Ti precursor serving as glass-forming raw materials, or an Si precursor and a Ti precursor are subjected to flame hydrolysis or thermal decomposition in a fluorine-containing atmosphere to obtain a fluorine-containing porous TiO$_2$—SiO$_2$ glass body, thereby obtaining a fluorine-containing TiO$_2$—SiO$_2$ glass body. Also, in the direct process, fluorine-containing materials are used as an Si precursor and a Ti precursor serving as glass-forming raw materials, or an Si precursor and a Ti precursor are hydrolyzed and oxidized in an oxyhydrogen flame at from 1,800 to 2,000° C. in a fluorine-containing atmosphere, thereby obtaining a fluorine-containing TiO$_2$—SiO$_2$ glass body.

For the manufacture of the TiO$_2$—SiO$_2$ glass (2), a manufacturing method including the foregoing steps (a) to (e) can be adopted. However, in the step (b), the porous TiO$_2$—SiO$_2$ glass body is kept in a fluorine-containing atmosphere at a temperature of not higher than the densification temperature, thereby obtaining a fluorine-containing porous TiO$_2$—SiO$_2$ glass body. This fluorine-containing atmosphere is preferably an inert gas atmosphere containing from 0.1 to 100% by volume of a fluorine-containing gas (for example, SiF$_4$, SF$_6$, CHF$_3$, CF$_4$, C$_2$F$_6$, C$_3$F$_8$, F$_2$, etc.). It is preferred that the treatment in such an atmosphere at a pressure of from 10,000 to 200,000 Pa for from several tens minutes to several hours is carried out at a high temperature of not higher than the densification temperature as described below. Also, when it is intended to lower the treatment temperature for obtaining the same doping amount of fluorine, this can be attained by prolonging the treatment time, specifically, keeping the porous TiO$_2$—SiO$_2$ glass body for from 5 to several tens hours. In order to increase the transmittance of the obtained glass, it is preferred to mix an oxygen gas in the heat treatment atmosphere.

The use of a temperature which is higher than the densification temperature is not preferred because the densification of the porous TiO$_2$—SiO$_2$ glass body proceeds so that it becomes hard to incorporate fluorine into the interior of the porous TiO$_2$—SiO$_2$ glass body.

For example, when SiF$_4$ is used as the fluorine-containing atmosphere, the treatment temperature and treatment time can be set as follows, in accordance with the amount of fluorine to be doped on the porous TiO$_2$—SiO$_2$ glass body.

When it is intended to regulate the doping amount of fluorine at 1,000 ppm or more and less than 3,000 ppm, this can be achieved by keeping the porous TiO$_2$—SiO$_2$ glass body in a gas atmosphere containing from 2 to 10% by volume of a fluorine-containing gas at from 500 to 1,000° C. for from 2 to several tens hours. When it is intended to regulate the doping amount of fluorine at from 3,000 to 7,000 ppm, this can be achieved by keeping the porous TiO$_2$—SiO$_2$ glass body in an inert gas atmosphere containing from 5 to several tens % by volume of a water vapor at from 800 to 1,100° C. for from 2 to several tens hours. When it is intended to regulate the doping amount of fluorine at more than 7,000 ppm, this can be achieved by keeping the porous TiO$_2$—SiO$_2$ glass body in an inert gas atmosphere containing from 5 to several tens % by volume of a water vapor at from 1,000° C. or higher for from 2 to several tens hours. In order to increase the transmittance of the obtained glass, it is preferred to mix an oxygen gas in the heat treatment atmosphere. Alternatively, the glass body is kept in an oxygen-containing atmosphere at from 300 to 1,300° C. for from 5 to several tens hours to an extent that it is not densified. This is made for the purpose of preventing coloration of the glass in the sequent heat treatment. The concentration of oxygen in the atmosphere is preferably from 1 to 100%, and for the purpose of preventing coloration of the glass more surely, it is more preferably from 20 to 100%.

In the case where fluorine is doped on a synthetic silica glass to be synthesized by a soot process as in the background art, it has been pointed out that doping with fluorine at a high temperature generates an oxygen deficient defect, which causes a reduction of the light transmittance. However, when used for an optical member to be used in a reflecting optical system, the reduction of the light transmittance does not matter. Accordingly, by treating at a temperature of not higher than the transparent vitrification temperature, it is possible to incorporate an extremely large amount of fluorine, and the doping amount of fluorine can be several thousand ppm or more at maximum.

Furthermore, since fluorine can be uniformly doped on the porous TiO$_2$—SiO$_2$ glass body within a short period of time between the steps (a) and (b), it is preferred to place the TiO$_2$—SiO$_2$ glass body under a reduced pressure (preferably not more than 13,000 Pa, and especially preferably not more than 1,300 Pa) and then introduce a mixed gas of a fluorine-containing gas and an inert gas thereinto until the pressure reaches normal pressure, thereby making the atmosphere into a fluorine-containing atmosphere.

Also, in the step (e), the formed TiO$_2$—SiO$_2$ glass body is kept at a temperature of from 600 to 1,200° C. for one hour or more and then subjected to an annealing treatment of decreasing the temperature to not higher than 500° C. at an average temperature-decreasing rate of not more than 60° C./hr, thereby controlling the fictive temperature of the TiO$_2$—SiO$_2$ glass. Alternatively, the formed TiO$_2$—SiO$_2$ glass body which is obtained in the step (d) and is at 1,200° C. or higher is subjected to an annealing treatment of decreasing the temperature to not higher than 500° C. at an average temperature-decreasing rate of not more than 60° C./hr, thereby controlling the fictive temperature of the TiO$_2$—SiO$_2$ glass. After decreasing the temperature to not higher than 500° C., the TiO$_2$—SiO$_2$ glass can be allowed to stand for cooling. In that case, the atmosphere is preferably an atmosphere of 100% of an inert gas such as helium, argon and nitrogen, an atmosphere containing, as a major component, such an inert gas, or an air atmosphere; and the pressure is preferably a reduced pressure or normal pressure.

For attaining a lower fictive temperature, it is effective to carry out cooling at a slower cooling rate in a temperature region in the vicinity of an annealing point or a strain point of the glass. Specifically, in the cooling profile of the step (e), the slowest cooling rate is preferably not more than 5° C./hr, more preferably not more than 4° C./hr, further preferably not more than 2.5° C./hr, especially preferably not more than 2° C./hr, and most preferably not more than 1.5° C./hr.

EXAMPLES

The present invention will be illustrated in greater detail with reference to the following Examples, but the invention should not be construed as being limited thereto. Examples 1, 2 and 6 are invention examples, and the remainder is comparative examples.

Example 1

$TiO_2$—$SiO_2$ glass fine particles obtainable by gasifying each of $TiCl_4$ and $SiCl_4$ which are glass-forming raw materials of a $TiO_2$—$SiO_2$ glass and then mixing and subjecting the mixture to heat hydrolysis (flame hydrolysis) in an oxyhydrogen flame was deposited and grown on a substrate, thereby forming a porous $TiO_2$—$SiO_2$ glass body (step (a)).

Since it is hard to handle the obtained porous $TiO_2$—$SiO_2$ glass body as it is, the obtained porous $TiO_2$—$SiO_2$ glass body was kept in air at 1,200° C. for 6 hours together with the substrate, and then separated from the substrate.

Thereafter, the porous $TiO_2$—$SiO_2$ glass body was placed in an atmosphere-controllable electric furnace and the pressure was reduced to 10 Torr at room temperature. Thereafter, water was boiled at atmospheric pressure and 100° C. in a glass-made bubbler, and the resulting porous $TiO_2$—$SiO_2$ glass body was kept in this atmosphere at 1,000° C. under normal pressure for 4 hours while introducing a water vapor together with an He gas into the furnace, thereby effecting doping with OH.

Thereafter, after raising the temperature to 1,450° C. in the same atmosphere, the system was kept at this temperature for 4 hours, thereby obtaining an OH-containing $TiO_2$—$SiO_2$ dense body (step (b)).

The obtained OH-containing $TiO_2$—$SiO_2$ dense body was heated to 1,700° C. in an argon atmosphere using a carbon furnace, thereby obtaining an OH-containing transparent $TiO_2$—$SiO_2$ glass body (step (c)).

The obtained OH-containing transparent $TiO_2$—$SiO_2$ glass body was heated to a temperature of the softening point or higher (1,750° C.) and formed in a desired shape, thereby obtaining an OH-containing formed $TiO_2$—$SiO_2$ glass body (step (d)).

The obtained glass was kept at 1,100° C. for 10 hours and then subjected to temperature decrease to 500° C. at a rate of 5° C./hr, followed by allowing it to stand for natural cooling (step (e)).

In Example 1, OH was incorporated into the glass body in step (c), and the fictive temperature of the glass body was lowered by the rate-cooling in step (e). Therefore, the COT was controlled by increasing $TiCl_4$ in step (a) so as to give a higher $TiO_2$ content of the glass body, as compared to a glass body not containing OH and having a higher fictive temperature.

Example 2

$TiO_2$—$SiO_2$ glass fine particles obtainable by gasifying each of $TiCl_4$ and $SiCl_4$ which are glass-forming raw materials of a $TiO_2$—$SiO_2$ glass and then mixing and subjecting the mixture to heat hydrolysis (flame hydrolysis) in an oxyhydrogen flame was deposited and grown on a substrate, thereby forming a porous $TiO_2$—$SiO_2$ glass body (step (a)).

Since it is hard to handle the obtained porous $TiO_2$—$SiO_2$ glass body as it is, the obtained porous $TiO_2$—$SiO_2$ glass body was kept in air at 1,200° C. for 4 hours together with the substrate, and then separated from the substrate.

Thereafter, the porous $TiO_2$—$SiO_2$ glass body was placed in an atmosphere-controllable electric furnace and the pressure was reduced to 10 Torr at room temperature. Thereafter, the resulting porous $TiO_2$—$SiO_2$ glass body was kept in this atmosphere at 1,100° C. under normal pressure for 4 hours while introducing a mixed gas of He and $SiF_4$ in a ratio of 90/10 (by volume), thereby effecting doping with fluorine.

Thereafter, the system was kept in an atmosphere of 100% $O_2$ at 1,050° C. under normal pressure for 4 hours, and the temperature was then raised to 1,450° C. in an atmosphere of 100% He, followed by keeping at this temperature for 4 hours, thereby obtaining a fluorine-containing $TiO_2$—$SiO_2$ dense body (step (b)).

The obtained fluorine-containing $TiO_2$—$SiO_2$ dense body was heated to 1,650° C. in an argon atmosphere using a carbon furnace, thereby obtaining a fluorine-containing transparent $TiO_2$—$SiO_2$ glass body (step (c)).

The obtained fluorine-containing transparent $TiO_2$—$SiO_2$ glass body was heated to a temperature of the softening point or higher (1,750° C.) and formed in a desired shape, thereby obtaining a fluorine-containing formed $TiO_2$—$SiO_2$ glass body (step (d)).

The obtained glass was kept at 1,000° C. for 10 hours and then subjected to temperature decrease to 300° C. at a rate of 5° C./hr, followed by allowing it to stand for natural cooling (step (e)).

In Example 2 also, taking into considerations that the fictive temperature of the grass body was lowered by the rate-cooling in step (e) and that fluorine was incorporated into the glass body in step (c), the COT was controlled by controlling the $TiO_2$ content of the glass body in step (a).

Example 3

$TiO_2$—$SiO_2$ glass fine particles obtainable by gasifying each of $TiCl_4$ and $SiCl_4$ which are glass-forming raw materials of a $TiO_2$—$SiO_2$ glass and then mixing and subjecting the mixture to heat hydrolysis (flame hydrolysis) in an oxyhydrogen flame was deposited and grown on a substrate, thereby forming a porous $TiO_2$—$SiO_2$ glass body (step (a)).

Since it is hard to handle the obtained porous $TiO_2$—$SiO_2$ glass body as it is, the obtained porous $TiO_2$—$SiO_2$ glass body was kept in air at 1,200° C. for 4 hours together with the substrate and then separated from the substrate.

Thereafter, the porous $TiO_2$—$SiO_2$ glass body was placed in an atmosphere-controllable electric furnace and the pressure was reduced to 10 Torr at room temperature. Thereafter, the resulting porous $TiO_2$—$SiO_2$ glass body was kept in this atmosphere at 900° C. under normal pressure for 4 hours while introducing a mixed gas of He and $SiF_4$ in a ratio of 90/10 (by volume), thereby effecting doping with fluorine.

Thereafter, the system was kept in an atmosphere of 100% $O_2$ at 1,050° C. under normal pressure for 4 hours, and the temperature was then raised to 1,450° C. in an atmosphere of 100% He, followed by keeping at this temperature for 4 hours, thereby obtaining a fluorine-containing $TiO_2$—$SiO_2$ dense body (step (b)).

The obtained fluorine-containing $TiO_2$—$SiO_2$ dense body was heated to 1,700° C. in an argon atmosphere using a carbon furnace, thereby obtaining a fluorine-containing transparent $TiO_2$—$SiO_2$ glass body (step (c)).

The obtained fluorine-containing transparent $TiO_2$—$SiO_2$ glass body was heated to a temperature of the softening point or higher (1,750° C.) and formed in a desired shape, thereby obtaining a fluorine-containing formed $TiO_2$—$SiO_2$ glass body (step (d)).

The obtained glass was kept at 1,100° C. for 10 hours and then subjected to temperature decrease to 300° C. at a rate of 150° C./hr, followed by allowing it to stand for natural cooling (step (e)).

Example 4

TiO$_2$—SiO$_2$ glass fine particles obtainable by gasifying each of TiCl$_4$ and SiCl$_4$ which are glass-forming raw materials of a TiO$_2$—SiO$_2$ glass and then mixing and subjecting the mixture to heat hydrolysis (flame hydrolysis) in an oxyhydrogen flame was deposited and grown on a substrate, thereby forming a porous TiO$_2$—SiO$_2$ glass body (step (a)).

Since it is hard to handle the obtained porous TiO$_2$—SiO$_2$ glass body as it is, the obtained porous TiO$_2$—SiO$_2$ glass body was kept in air at 1,200° C. for 4 hours together with the substrate and then separated from the substrate.

Thereafter, the porous TiO$_2$—SiO$_2$ glass body was placed in an atmosphere-controllable electric furnace and the pressure was reduced to 10 Torr at room temperature. Thereafter, the temperature was raised to 1,450° C. in an atmosphere of 100% He, followed by keeping at this temperature for 4 hours, thereby obtaining a TiO$_2$—SiO$_2$ dense body (step (b)).

The obtained TiO$_2$—SiO$_2$ dense body was heated to 1,750° C. in an argon atmosphere using a carbon furnace, thereby obtaining a transparent TiO$_2$—SiO$_2$ glass body (step (c)).

The obtained transparent TiO$_2$—SiO$_2$ glass body was heated to a temperature of the softening point or higher (1,750° C.) and formed in a desired shape, thereby obtaining a formed TiO$_2$—SiO$_2$ glass body (step (d)).

The obtained glass was kept at 1,100° C. for 10 hours and then subjected to temperature decrease to 500° C. at a rate of 150° C./hr, followed by allowing it to stand for natural cooling (step (e)).

Example 5

ULE#7972, manufactured by Corning Incorporated, which is known as a zero-expansion TiO$_2$—SiO$_2$ glass.

Example 6

TiO$_2$—SiO$_2$ glass fine particles obtainable by gasifying each of TiCl$_4$ and SiCl$_4$ which are glass-forming raw materials of a TiO$_2$—SiO$_2$ glass and then mixing and subjecting the mixture to heat hydrolysis (flame hydrolysis) in an oxyhydrogen flame was deposited and grown on a substrate, thereby forming a porous TiO$_2$—SiO$_2$ glass body (step (a)).

Since it is hard to handle the obtained porous TiO$_2$—SiO$_2$ glass body as it is, the obtained porous TiO$_2$—SiO$_2$ glass body was kept in air at 1,200° C. for 6 hours together with the substrate and then separated from the substrate.

Thereafter, the porous TiO$_2$—SiO$_2$ glass body was placed in an atmosphere-controllable electric furnace and the pressure was reduced to about 1,000 Pa (7.50 Torr) at room temperature. Thereafter, water was charged in a glass-made bubbler, boiled at atmospheric pressure and 100° C., and then subjected to bubbling with an He gas, and the resulting porous TiO$_2$—SiO$_2$ glass body was kept in this atmosphere at 1,000° C. under normal pressure for 4 hours while introducing a water vapor together with an He gas into the furnace, thereby effecting doping with OH.

Thereafter, after raising the temperature to 1,450° C. in the same atmosphere, the system was kept at this temperature for 4 hours, thereby obtaining an OH-containing TiO$_2$—SiO$_2$ dense body (step (b)).

The obtained OH-containing TiO$_2$—SiO$_2$ dense body was heated to 1,700° C. in an argon atmosphere using a carbon furnace, thereby obtaining an OH-containing transparent TiO$_2$—SiO$_2$ glass body (step (c)).

The obtained transparent TiO$_2$—SiO$_2$ glass body was heated to a temperature of the softening point or higher (1,750° C.) and formed in a desired shape, thereby obtaining a formed TiO$_2$—SiO$_2$ glass body (step (d)).

The obtained glass was kept at 1,100° C. for 10 hours and then subjected to temperature decrease to 900° C. at a rate of 10° C./hr, temperature decrease to 700° C. at a rate of 1° C./hr and subsequent temperature decrease to 500° C. at a rate of 10° C./hr, followed by allowing it to stand for natural cooling (step (e)).

In Example 6, OH was incorporated into the glass body in step (c), and the fictive temperature of the glass body was lowered by the rate-cooling in step (e). Therefore, the COT was controlled by increasing TiCl$_4$ in step (a) so as to give a higher TiO$_2$ content of the glass body, as compared to a glass body not containing OH and having a higher fictive temperature.

Example 7

TiO$_2$—SiO$_2$ glass fine particles obtainable by gasifying each of TiCl$_4$ and SiCl$_4$ which are glass-forming raw materials of a TiO$_2$—SiO$_2$ glass and then mixing and subjecting the mixture to heat hydrolysis (flame hydrolysis) in an oxyhydrogen flame is deposited and grown on a substrate, thereby forming a porous TiO$_2$—SiO$_2$ glass body (step (a)).

Since it is hard to handle the obtained porous TiO$_2$—SiO$_2$ glass body as it is, the obtained porous TiO$_2$—SiO$_2$ glass body is kept in air at 1,200° C. for 6 hours together with the substrate and then separated from the substrate.

Thereafter, the porous TiO$_2$—SiO$_2$ glass body is placed in an atmosphere-controllable electric furnace and the pressure is reduced to about 10 Pa at room temperature. After raising the temperature to 1,450° C. in the vacuum atmosphere, the system is kept at this temperature for 4 hours, thereby obtaining a TiO$_2$—SiO$_2$ dense body (step (b)).

The obtained TiO$_2$—SiO$_2$ dense body is heated to 1,750° C. in an argon atmosphere using a carbon furnace, thereby obtaining a transparent TiO$_2$—SiO$_2$ glass body (step (c)).

The obtained transparent TiO$_2$—SiO$_2$ glass body is heated to a temperature of the softening point or higher (1,750° C.) and formed in a desired shape, thereby obtaining a formed TiO$_2$—SiO$_2$ glass body (step (d)).

The obtained glass is kept at 1,100° C. for 10 hours and then subjected to temperature decrease to 500° C. at a rate of 3° C./hr, followed by allowing it to stand for natural cooling (step (e)).

In Example 7, the fictive temperature of the glass body is lowered by the rate-cooling in step (e). Therefore, the COT is controlled by increasing TiCl$_4$ in step (a) so as to give a higher TiO$_2$ content of the glass body, as compared to a glass body not containing OH and having a higher fictive temperature.

Figure 3:
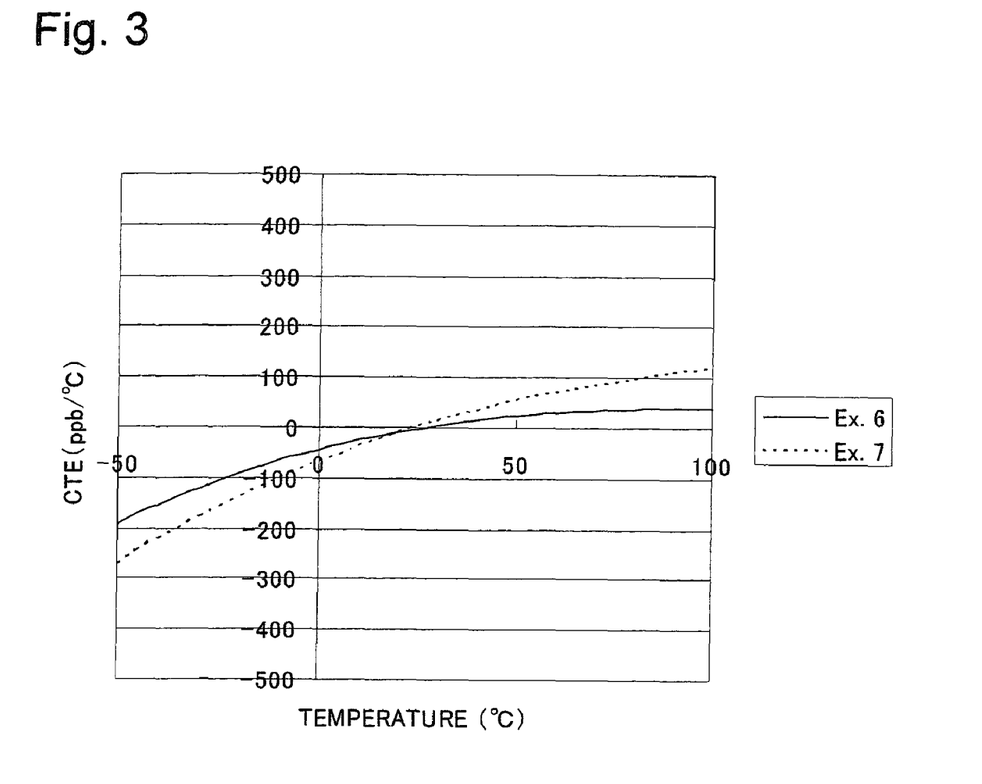
FIG. 3 is a graph of plotting the relationship between CTE and the temperature, with respect to Examples 6 and 7.

The temperature dependence of coefficient of thermal expansion of each of the glasses of the foregoing Examples 1 to 7 is shown in FIGS. 2 and 3. The coefficient of thermal expansion of glass was measured by using a laser interferometric dilatometer (LIX-1, manufactured by ULVAC-RIKO, Inc.).

Also, the results of the measurement of respective physical properties are summarized and shown in Table 1. With respect to the evaluation methods, the measurements were made in accordance with the methods mentioned above, respectively. Also, the COT shown in Table 1 was derived by determining the temperature at which the coefficient of thermal expansion was 0 ppb/° C., from the curve shown in FIGS. 2 and 3. The ΔT shown in Table 1 was derived by determining the temperature range where the coefficient of thermal expansion was from −5 to 5 ppb/° C. from the curve of FIGS. 2 and 3.

TABLE 1

|  | Fictive temperature [° C.] | OH concentration [ppm] | F concentration [ppm] | COT [° C.] | ΔT [° C.] | CTE at 22 ± 2° C. [ppb/° C.] |
|---|---|---|---|---|---|---|
| Example 1 | 840 | 1030 | N.D. | 20.6 | 6.8 | −0.9 to 4.8 |
| Example 2 | 750 | <10 | 9000 | 19.7 | 9.7 | 0.3 to 4.3 |
| Example 3 | 1020 | <10 | 900 | 21.1 | 4.7 | −2.3 to 6.2 |
| Example 4 | 1070 | 30 | N.D. | 24.4 | 4.1 | −10.7 to −0.7 |
| Example 5 | 900 | 880 | N.D. | −2.4 | 4.7 | 44.4 to 51.6 |
| Example 6 | 780 | 1030 | N.D. | 26.3 | 7.8 | −8.7 to −3.1 |
| Example 7 | 970 | 30 | N.D. | 24.4 | 4.1 | −10.7 to 0.7 |

As is clear from Table 1, in Examples 1, 2 and 6 in which the COT falls within the range of 23±4° C., and the ΔT is 5° C. or more, the coefficient of thermal expansion is substantially zero under a temperature condition (22±2° C.) in an exposure tool at the time of carrying out EUVL, and therefore, the glasses of these Examples 1, 2 and 6 are suitable for an optical member of an exposure tool for EUVL.

While the present invention has been described in detail and with reference to specific embodiments thereof, it will be apparent to one skilled in the art that various changes and modifications can be made therein without departing from the spirit and scope thereof.

This application is based on Japanese Patent Application Nos. 2007-336603 (filed Dec. 27, 2007) and 2008-207705 (filed Aug. 12, 2008), and the contents thereof are herein incorporated by reference.

The invention claimed is:

1. A $TiO_2$-containing silica glass having a temperature, at which a coefficient of thermal expansion is 0 ppb/° C., falling within a range of 23±4° C., a temperature width, in which a coefficient of thermal expansion is 0±5 ppb/° C., of 5° C. or more, and an OH concentration of 100 ppm or more.

2. The $TiO_2$-containing silica glass according to claim 1, having a fictive temperature of not higher than 850° C., and a $TiO_2$ content of from 3 to 9% by mass.

3. The $TiO_2$-containing silica glass according to claim 1, wherein the temperature, at which a coefficient of thermal expansion is 0 ppb/° C., is within a range of 22 ±2° C.

4. The $TiO_2$-containing silica glass according to claim 1, wherein the temperature width, in which a coefficient of thermal expansion is 0±5 ppb/° C., is 6° C. or more.

5. The $TiO_2$-containing silica glass according to claim 1, wherein the temperature width, in which a coefficient of thermal expansion is 0±5 ppb/° C., is 7.8° C. or more.

6. The $TiO_2$-containing silica glass according to claim 1, wherein the OH concentration is 200 ppm or more.

7. A $TiO_2$-containing silica glass having a temperature, at which a coefficient of thermal expansion is 0 ppb/° C., falling within a range of 23±4° C., a temperature width, in which a coefficient of thermal expansion is 0±5 ppb/° C., of 5° C. or more, a fictive temperature of not higher than 850° C., and an F concentration of 1,000 ppm or more.

8. The $TiO_2$-containing silica glass according to claim 7, having a $TiO_2$ content of from 3 to 9% by mass.

9. The $TiO_2$-containing silica glass according to claim 7, wherein the temperature, at which a coefficient of thermal expansion is 0 ppb/° C., is within a range of 22 ±2° C.

10. The $TiO_2$-containing silica glass according to claim 7, wherein the temperature width, in which a coefficient of thermal expansion is 0±5 ppb/° C., is 6° C. or more.

11. The $TiO_2$-containing silica glass according to claim 7, wherein the temperature width, in which a coefficient of thermal expansion is 0±5 ppb/° C., is 8° C. or more.

* * * * *